(12) United States Patent  
Horstmann et al.

(10) Patent No.: US 7,546,351 B1  
(45) Date of Patent: *Jun. 9, 2009

(54) METHODS AND SYSTEMS FOR FILTERING, SORTING, AND DISPATCHING MESSAGES TO WIRED AND WIRELESS DEVICES

(75) Inventors: Jens U. Horstmann, Santa Clara, CA (US); Ajay H. Giovindarajan, Santa Clara, CA (US); Alan Rothkopf, Palo Alto, CA (US); Tal Dayan, Cupertino, CA (US); Arie Avnur, Cupertino, CA (US); Justin M. Kitagawa, Moraga, CA (US); Carolyn B. Boyce, Sunnyvale, CA (US); Aleksandr M. Schvartsman, Sunnyvale, CA (US); Aswath N. Satrasala, San Jose, CA (US); Vincent L. Tang, Pleasanton, CA (US)

(73) Assignee: MXGO, Pleasanton, CA (US)

( * ) Notice: Subject to any disclaimer, the term of this patent is extended or adjusted under 35 U.S.C. 154(b) by 120 days.

This patent is subject to a terminal disclaimer.

(21) Appl. No.: 11/724,918

(22) Filed: Mar. 15, 2007

(51) Int. Cl.  
*G06F 15/16* (2006.01)

(52) U.S. Cl. .................................. 709/206; 709/248

(58) Field of Classification Search ............. 709/206, 709/248  
See application file for complete search history.

(56) References Cited

U.S. PATENT DOCUMENTS

| | | | |
|---|---|---|---|
| 5,577,202 A | 11/1996 | Padgett | |
| 5,844,969 A | 12/1998 | Goldman et al. | |
| 5,956,521 A | 9/1999 | Wang | |
| 6,138,146 A | 10/2000 | Moon et al. | |
| 6,199,102 B1 * | 3/2001 | Cobb | 709/206 |
| 6,606,647 B2 | 8/2003 | Shah et al. | |
| 6,654,787 B1 * | 11/2003 | Aronson et al. | 709/206 |
| 6,708,217 B1 | 3/2004 | Colson et al. | |
| 6,725,269 B1 * | 4/2004 | Megiddo | 709/228 |
| 6,741,980 B1 | 5/2004 | Langseth et al. | |
| 6,779,022 B1 * | 8/2004 | Horstmann et al. | 709/206 |
| 7,062,538 B2 | 6/2006 | Horstmann et al. | |

(Continued)

OTHER PUBLICATIONS

U.S. Appl. No. 11/796,591, filed Apr. 2007, Horstmann et al.

(Continued)

*Primary Examiner*—Krisna Lim  
(74) *Attorney, Agent, or Firm*—Silicon Edge Law Group LLP; Arthur J. Behiel

(57) ABSTRACT

A communication server collects messages from a number of user accounts and presents them to the user from a single location. The user can set the mail server to block unwanted messages and to forward others to various receiving devices, including mobile telephones and pagers. Forwarded messages are automatically reformatted for the receiving device, while a copy of the original message is retained. The retained copy can be viewed later if the user is interested in message content that was not available to the wireless device. The user can also use the wireless device to forward the original message to another receiving device. In the case of forwarding, the saved original message and not the reformatted message is sent to the forwarding address. Replies to messages directed to the user from different message sources identify the user by message source to allow the user to maintain separate email identities.

6 Claims, 9 Drawing Sheets

U.S. PATENT DOCUMENTS

| | | | |
|---|---|---|---|
| 7,231,423 | B1 * | 6/2007 | Horstmann et al. ......... 709/204 |
| 2002/0016818 | A1 | 2/2002 | Kirani et al. |
| 2002/0023143 | A1 | 2/2002 | Stephenson et al. |
| 2002/0024947 | A1 | 2/2002 | Luzzatti et al. |
| 2002/0026500 | A1 | 2/2002 | Kanefsky et al. |
| 2002/0078198 | A1 | 6/2002 | Buchbinder et al. |
| 2003/0026393 | A1 | 2/2003 | Skladman et al. |
| 2003/0104827 | A1 | 6/2003 | Moran et al. |
| 2004/0205198 | A1 | 10/2004 | Zellner et al. |
| 2005/0004992 | A1 | 1/2005 | Horstmann et al. |
| 2005/0064850 | A1 | 3/2005 | Irlam et al. |
| 2005/0089052 | A1 | 4/2005 | Chen et al. |
| 2006/0155808 | A1 | 7/2006 | Irlam et al. |
| 2006/0245426 | A1 | 11/2006 | Mathis et al. |
| 2007/0233806 | A1 | 10/2007 | Asadi |

OTHER PUBLICATIONS

U.S. Appl. No. 11/451,646, filed Jun. 2006, Horstmann et al.
Maniatis, Petros, "The Mobile People Architecture." Mobile Computing and Communications Review, vol. 1, No. 2. Jul. 1999. pp. 1-7.
Appenzeller, Guido, "The Mobile People Architecture." Technical [sic] Report: CSL-TR-99-777. Jan. 1999. pp. 1-12.
Roussopoulos, Mema et al., "Person-Level Routing in the Mobile People Architecture." Oct. 1999. 12 pages.
"Wireless Secretary Pro for Outlok Features." JTech Software Data-Software Solutions to Everyday Problems. Last modified Jun. 3, 2000. 2 pages.
"These Deals Say Wireless E-Mail Has Arrived." BW Online. Mar. 7, 2000. pp. 1-2.
Yahoo! http://us.f47.mail.yahoo.com/ym/Preferences ?LYY=92714. Downloaded Sep. 27, 2000. 2 pages.
Yahoo! Alerts. Downloaded from http://alerts.yahoo.com/ Downloaded Sep. 27, 2000. 1 page.
"Tied to the Desk?". Yahoo! Mobile Alerts. Downloaded from http://mobile1.yahoo.com/wireless/alert. Copyright 1994-2000. 1 page.
"Add Your Mobile Devices." Yahoo! Mobile downloaded on Sep. 27, 2000 from http://mobile1.yahoo.com/wireless/adddevice!.done=/wireless/selectdevice%3f.t=e, 1 page.
Yahoo! Mail. Downloaded from http://us.f47.mail.yahoo.com/ym.login?.rand=cbglgid3du2ia ? Downloaded Sep. 27, 2000. 11 pages.
Crouch, Cameron, "Enhanced Services and Directory Aim to Secure Wireless Yahoo Against Encroaching Competition." From PC World.com. Mar. 21, 2000. 1 page.
The Mobile People Architecture Home Page, downloaded from http://mpa.stanford,edu/publications/. Sep. 28, 2000. 1 page.

* cited by examiner

900

NEW WIRELESS DEVICE

DESCRIBE DEVICE

TYPE OF DEVICE [PHONE ▷]

E-MAIL ADDRESS FOR DEVICE

INCLUDE THE FOLLOWING IN
MESSAGES SENT TO THIS DEVICE:

☑ SUBJECT
☑ CC

LIMIT THE NUMBER OF CHARACTERS
WITHIN THE BODY OF THE MESSAGE:

[700 ▷]

( OK )  ( CANCEL )

FIG. 9

METHODS AND SYSTEMS FOR FILTERING, SORTING, AND DISPATCHING MESSAGES TO WIRED AND WIRELESS DEVICES

REFERENCE TO CD APPENDIX

The CD Appendix, which is incorporated herein by this reference, contains the source code for an embodiment of the invention, features of which are described below in connection with the drawings. The file that includes the source code is named "CD appendix OG001.C1C1C1.US.txt," was created Mar. 10, 2007, and is 4,430 KB. The copyright owner of the material in the CD Appendix has no objection to the facsimile reproduction by anyone of the patent document or the patent disclosure, as it appears in the Patent and Trademark Office files and records, but otherwise reserves all copyright rights.

BACKGROUND AND SUMMARY

Many computer users maintain a number of different email accounts. For example, many users have separate accounts for home and work. Unfortunately, maintaining more than one account can be cumbersome, often requiring the user to check his or her mail at more than one location. A communications server in accordance with the invention simplifies this process by automatically collecting all of the messages from two or more email sources and presenting the collection to the user.

Some conventional mail systems collect mail from various sources. However, such systems do not work in many cases in which one of the email sources is a client connected to the mail system via a protective firewall. In such cases, the firewall will not allow the mail collection systems to pull mail from the protected client. To address this problem, an embodiment of the invention includes a mail agent that can be added to a protected client to instruct the client to periodically push messages to the mail system. The mail system is therefore not limited to mail collection from sources on the same network, and can therefore provide the user with a complete listing of the user's mail from a single location.

In addition to providing the user access to a number of mail sources, one embodiment of the invention dispatches messages to an appropriate receiving device based on the user's needs, as specified by the user. For example, a communications server in accordance with one embodiment can be configured to dispatch important messages to a wireless device, such as a mobile phone or pager.

Forwarded messages are automatically reformatted for the receiving device, while a copy of the original message is retained. The retained copy can be viewed later if the user is interested in message content that is incompatible with the wireless device. The user can also use the wireless device to forward the original message to another receiving device. In the case of forwarding, the saved original message and not the reformatted message is sent to the forwarding address.

Some conventional email services collect messages from various mail sources, allowing users to receive both messages directed to a user's work address and messages directed to a user's home address, for example. When the user then responds to these messages, a single email address identifies the source of the reply. Assume, for example, that a user is assigned that user address "user@home" for a personal email account and "user@work" for a work-related email account. Further assume that the user's email system collects mail directed to both the work and home accounts, allowing the user to respond to personal and work-related messages from home. The user responding from home to a collection of work-related email messages will typically respond to each message as "user@home" Subsequent replies from the user's response message will then be directed to the user's home address, even if the original message was directed to the user's work account. This failure to maintain the user's separate identities can be problematic, as the user will not be able to effectively categorize messages if the user's work and home identities are not preserved. An embodiment of the invention addresses this problem, allowing a user to easily maintain separate user identities.

In one embodiment that forwards messages to wireless devices, if the user's mobile phone is unavailable, then the original message is reformatted and forwarded to the user's pager. This embodiment is beneficial, particularly for urgent messages, as pagers generally provide a more robust means of communication than do mobile phones.

This summary does not limit the claims, which are defined instead by the claims.

BRIEF DESCRIPTION OF THE DRAWINGS

FIG. 9 depicts an HTML form 900 that the user fills out to register a wireless receiving device, such as a pager or mobile phone, so that dispatcher 154 can forward messages to the device.

DETAILED DESCRIPTION

Figure 1:
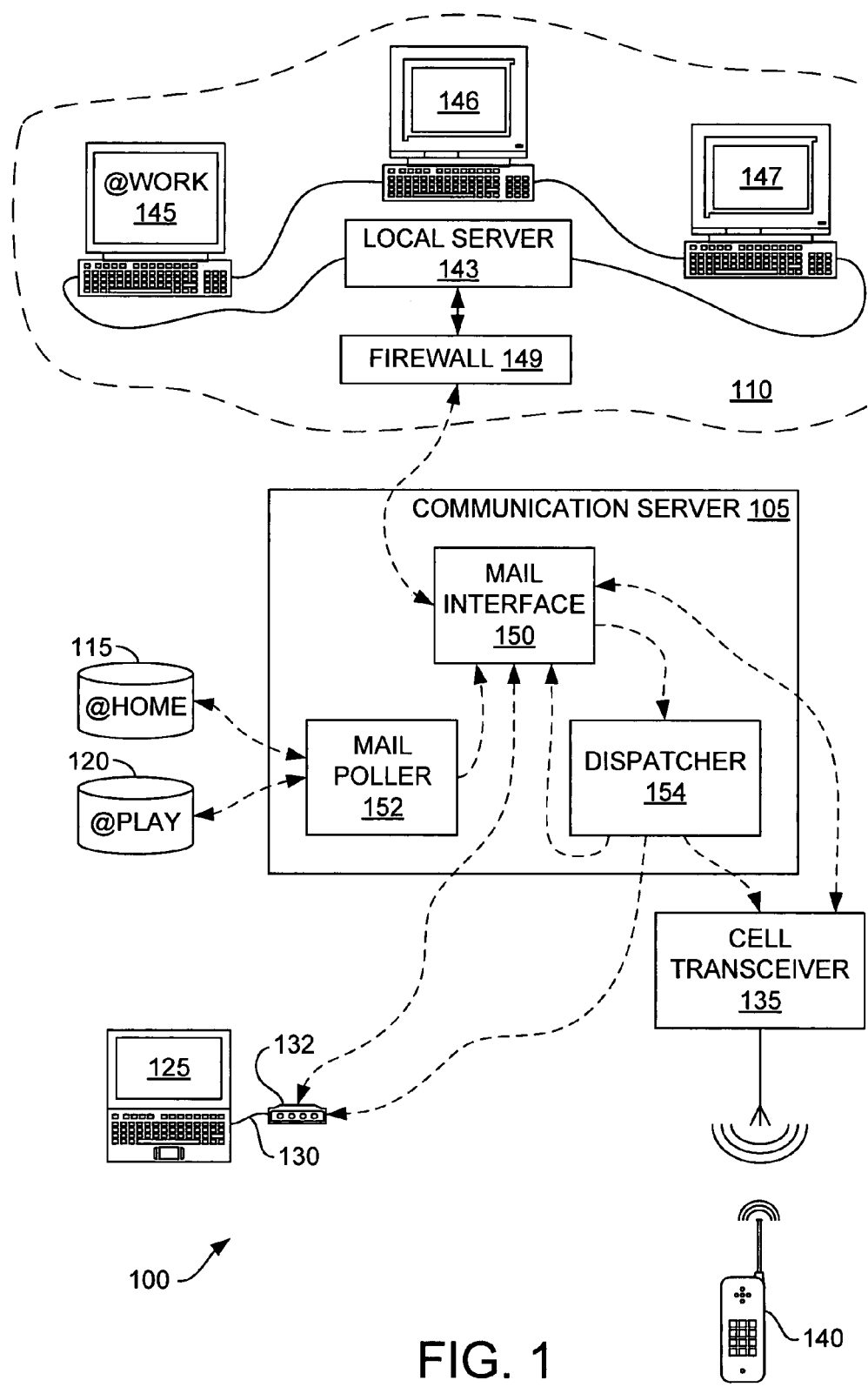
FIG. 1 depicts a system 100 in accordance with an embodiment of the present invention.

FIG. 1 depicts a system 100 in accordance with an embodiment of the present invention. System 100 includes a number of entities that communicate with one another over a large network, such as the Internet. In FIG. 1, dotted lines terminating in arrows represent communications that can take place over the Internet. System 100 includes a communications server 105, an intranet 110, a pair of mail servers 115 and 120, a laptop computer 125 hardwired to the Internet via a local line 130 and a modem 132, and a cell transceiver 135 adapted to communicate with a wireless device 140, such as a cell phone that communicates via the conventional Wireless Application Protocol (WAP).

As is conventional, intranet 110 is a network designed for information processing within an organization. Intranet 110 typically employs applications that allow users to communicate with others within intranet 110 and, via the Internet, with others outside of intranet 110. Such applications typically include Web browsers and email programs. Intranet 110 includes a local server 143, a number of clients 145-147, and a firewall 149. Clients 145-147 communicate with one another within intranet 110 without their messages traversing firewall 149. Firewall 149 is a conventional security system intended to protect an organization's network against external threats available over the Internet. Among other things, firewall 149 prevents clients 145-147 from communicating directly with communications server 105 and other entities on the Internet.

Communications server 105 includes a mail interface 150, a mail poller 152, and a dispatcher 154. Mail poller 152 polls various email sources, such as servers 115 and 120, to consolidate messages from different information sources that are all assigned to the same user.

Figure 2:
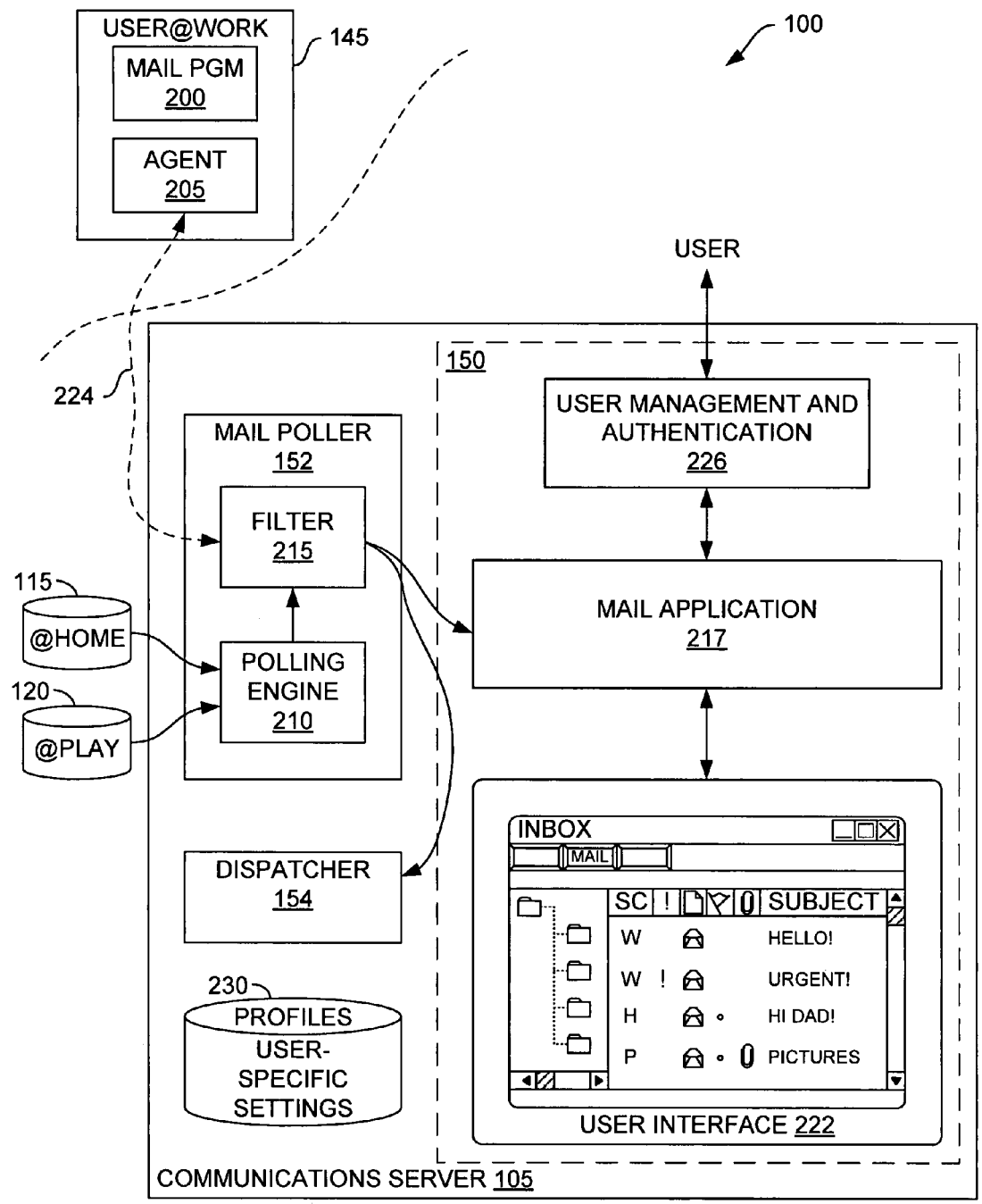
FIG. 2 depicts system 100 FIG. 1, showing client 145 and communications server 105 in more detail, while eliminating other features for simplicity.
Figure 3:
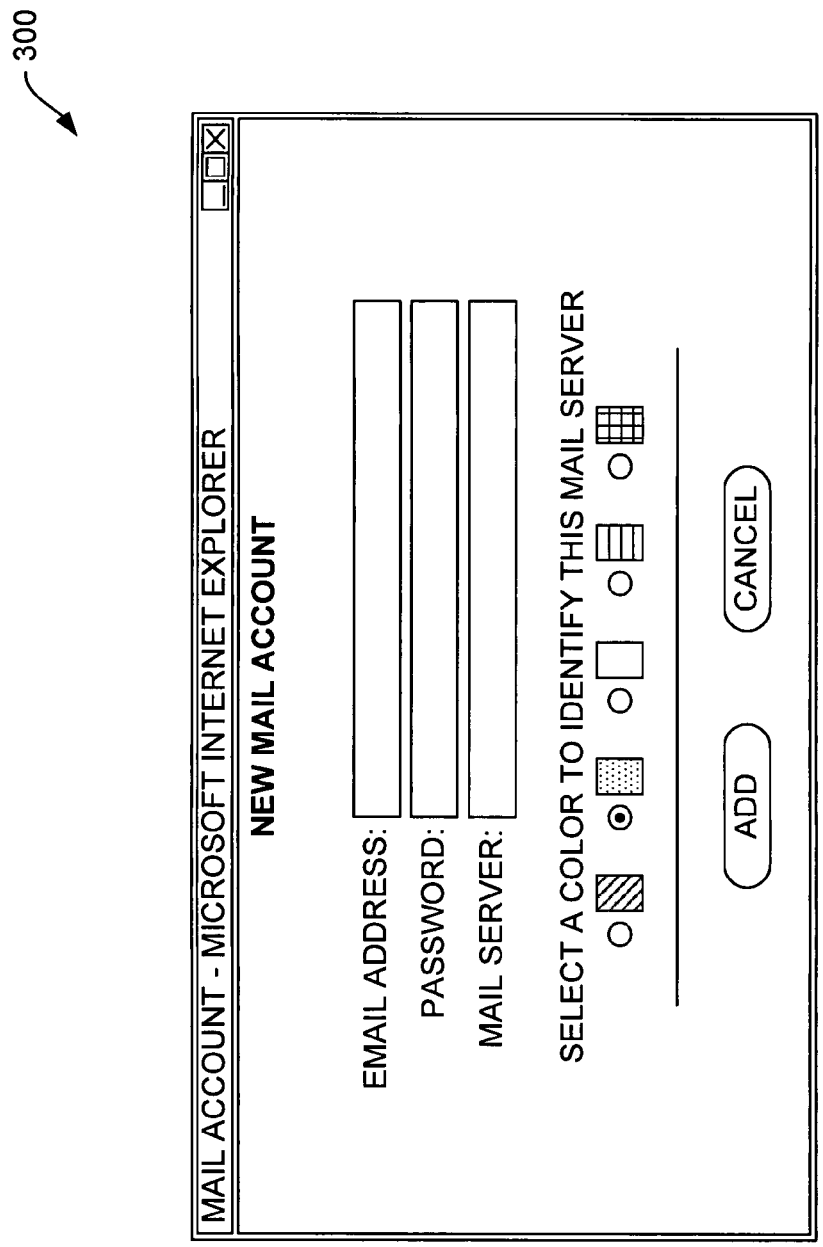
FIG. 3 depicts a "screen shot" of a form 300 that allows the user to specify an email source account and choose a corresponding color.

The examples presented in connection with FIGS. 1-3 assume that single user "USER" maintains three email accounts. The first, "user@work," resides on local server 143 and may be accessed by the user via client 145. The second, "user@home," is a personal account stored on server 115 that the user distributes to family and friends for personal correspondence. Finally, the third, "user@play," is another email account stored on server 120 that the user maintains to communicate with other users that may share a hobby, for example. These examples are illustrative; network users often have numerous email accounts for any number of reasons.

Messages for use in one embodiment of the invention are encoded using the well-known Simple Mail Transfer Protocol (SMTP). Servers 115 and 120 typically communicate messages using the POP3 post-office protocol, but may also use the more recent Internet Message Access Protocol (IMAP). Both POP3 and IMAP employ SMTP to communicate between client and server.

In addition to collecting messages from the various email sources via poller 152, mail interface 150 is adapted to periodically receive messages pushed through firewall 149 to communications server 105, for example from client 145. In one embodiment, client 145 is adapted to include a software application that periodically pushes messages from client 145 to mail interface 150. The application is often necessary, as mail interface 150 cannot poll client 145 through firewall 149. Consequently, the user would not have access to mail stored on client 145 unless the user had access to the client on intranet 110. This is a problem, for example, when the user is away from the office and attempting to retrieve his or her messages using laptop 125, for example. The portion of the attached source code that includes the client-side plug-in enabling the email push is: "src/skywalker/accessors/desktop/desktopagent." (pp. 294-393). The portion of the attached source code that includes the corresponding server-side code is: "src/skywalker/accessors/desktop/server" (pp. 289-293).

The user configures mail interface 150 to collect all messages associated with the three user mail accounts by receiving pushed messages from client 145 and by polling for messages on servers 115 and 120. Communications server 105 can then be accessed by the user using any number of message-receiving devices, such as client 145, laptop 125, or wireless device 140. The user can thus retrieve all of his or her messages from any device that provides Internet access.

In addition to providing the user access to a number of mail sources, communications server 105 dispatches messages to an appropriate receiving device based on the user's needs, as specified by the user to communications server 105. For example, communications server 105 can be configured so that dispatcher 154 dispatches messages flagged as urgent to wireless device 140 via cell receiver 135. Messages flagged as "urgent" need not include the term "urgent," but include some portion of the message that identifies the message as having a higher priority than other messages. Other dispatch criteria are discussed below in connection with FIG. 8.

FIG. 2 depicts system 100 FIG. 1, showing client 145 and communications server 105 in more detail, while eliminating other features for simplicity. As shown, client 145 includes a mail program 200 and a mail agent 205. As noted above, communications server 105 polls multiple information sources to consolidate user messages directed to different addresses assigned to a user. Mail polling is not new; however, Internet servers are believed to be unable to consolidate all types of user messages because firewalls such as firewall 149 of the Internet 110 preclude servers from polling messages from intranet clients such as client 145. Applicants therefore extended conventional mail program 200 to include a mail agent 205. Mail agent 205 periodically pushes messages collected by agent 205 to mail poller 152 of communications server 105. The program modules specific to poller 152 are preceded by "package skywalker.apps.email.".

Mail poller 152 includes a polling engine 210 and a filter or filters 215. Polling engine 210 periodically downloads the user messages from servers 115 and 120 and conveys the messages to filter 215. Filter 215 applies blocking and filtering rules to the polled messages from polling engine 210 and to any messages obtained from agent 205. Messages that make it through filter 215 are conveyed to mail application 217, and are possibly dispatched to an appropriate user device using a dispatcher 154. Mail application 217 presents the received new messages to the user using a user interface 222.

User interface 222 presents the messages to the user, segregating the messages based on source. For example, messages from "user@home" may be associated with a different color than messages from "user@work" or "user@play." FIG. 3 depicts a "screen shot" of a form 300 that allows the user to specify an email source account and choose a corresponding color. Mail application 217, identified as "Mail-FrontHandler" in the attached source code, handles interfacing with the user over various devices. Mail application 217, in conjunction with user interface 222, allows the user to interact with communications server 105 to send and retrieve mail and to configure the collection of user-specific variables that control message filtering, dispatching, and blocking. Mail application 217 supports HyperText Markup Language (HTML) to communicate forms and documents. Mail application 217 also supports Wireless Markup Language (WML) and Handheld Device Markup Language (HDML) to format content for Web-enabled mobile phones.

A user accesses communications server 105 over a conventional connection, such as an Internet connection 224. A user-management and authentication module 226 communicates with the user, verifying the user's personal identity and allowing the user to configure his or her mail settings. Configuration information is stored in a profile server 230 within communications server 105. Although not shown in FIG. 2, user management and authentication module 226 also facilitates communication with the user via wireless devices, such as cellular phones. The portions of the attached source code that deal with user management and authentication module 226 are prefaced with "MainServLet" for HTML and prefaced with "ephone" for wireless devices.

Conventional email services collect messages from various sources, allowing users to receive messages directed to a work address and messages directed to a home address, for example. When the user then responds to these messages, a single email address identifies the source of the reply. For example, a user responding from home to a collection of work-related email messages will respond to each message as "user@home." Subsequent replies from the original message sources will then be directed to the user's home address.

For example, if a collection of messages includes one from the user's employer directed to "user@work" and another from a family member directed to "user@home," then the user will respond to both messages either as "user@work" or "user@home," depending upon whether the user responded from home or from work. This can be problematic, as the user will not be able to effectively filter messages based on identity if the user's identities are not preserved, regardless of the account from which the user responds to messages. Thus, if the user's employer sends a message to "user@work," then user will want to respond as "user@work," and if a family member sends a message to "user@home," then the user will want to respond as "user@home." Some mail systems allow the user to manually change the "from" address of messages; unfortunately, manually switching between address is cumbersome and invites errors. An embodiment of the invention addresses this problem, allowing a user to easily maintain separate identities.

Figure 4:
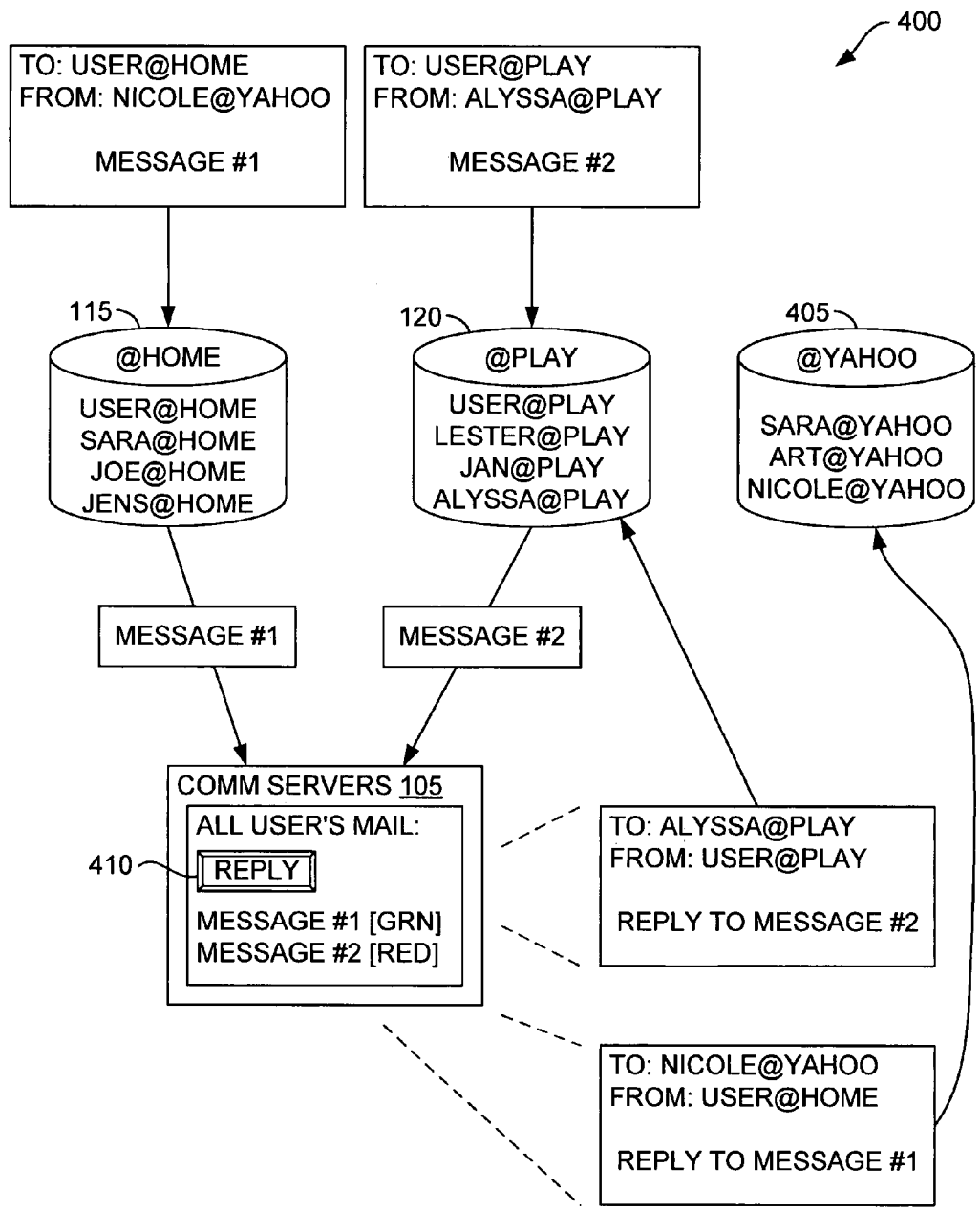
FIG. 4 is a flowchart 400 depicting the manner in which communications server 105 maintains user identities when the user responds to email messages directed to different ones of the user's identities.

FIG. 4 is a flowchart 400 depicting the manner in which communications server 105 maintains user identities when the user responds to email messages directed to different ones of the user's identities. Communications server 105 organizes incoming messages by their respective destination addresses. Thus, messages directed to user@home would be stored in directory locations associated with the user's "home" identity, while messages directed to user@work would be stored in directory locations associated with the user's "work" identity. Communications server 105 then replies to messages using the destination address associated with the respective identity. Alternatively, mail application 217 can save the "to" field from incoming messages and use this information to identify the author of message replies. This method is not preferred, however, as the "to" field can sometimes incorrectly identify a message recipient.

Referring again to the example of FIG. 4, assume that "Nicole@yahoo" sent a message No. 1 to "user@home," and that "Alyssa@play" sent a message No. 2 to "user@play." Communications server 105 stores each of messages No. 1 and No. 2, depicting each in a manner that identifies the source address to the user. In the example, message #1 is green to indicate that message #1 was directed to the user's home address, and message #2 is red to indicate that message #2 was directed to the user's play address. The chosen colors are arbitrary, and other colors and distinctions can be used to distinguish messages.

Should the user initiate a response to either message (by selecting a reply icon 410, for example), the user's reply identifies the sender as having the email address to which the original message was directed. In the example of FIG. 4, the reply to "Alyssa@play" (to mail server 120) is identified as being from "user@play" and the reply to "Nicole@yahoo" (to a yahoo mail server 405) is identified as being from "user@home," even though both replies are from the same server 105. Server 105 need not be associated with any of the depicted mail servers 115, 120, or 405, but may have an entirely different path name. Alternatively, servers 115 and 120 may be "native" servers that are part of server 105. Reply icon 410 is a conventional "button" linked to a selected one of the first and second messages. Many other methods of initiating message replies will be obvious to those of skill in the art.

Figure 5:
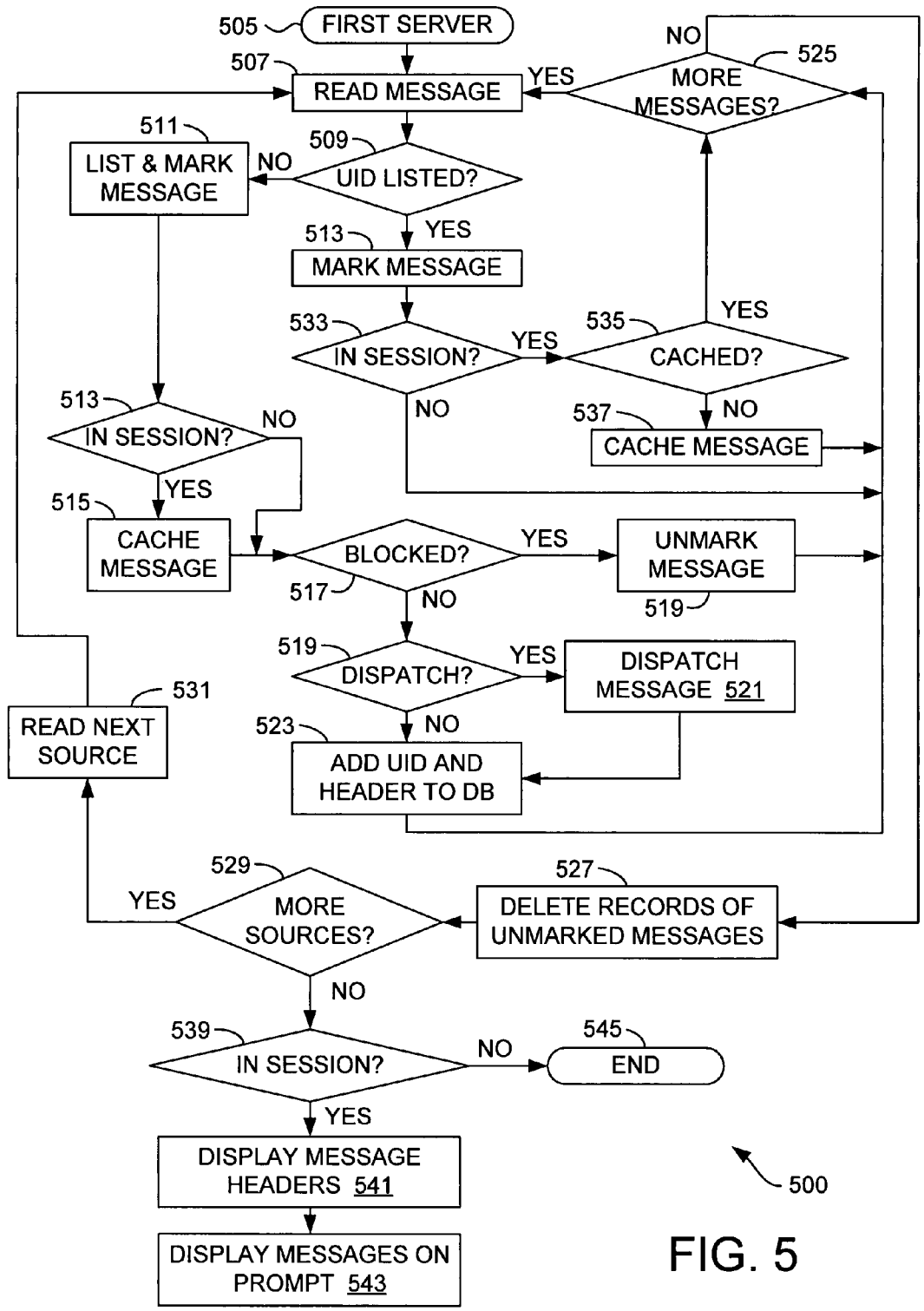
FIG. 5 is a flowchart 500 depicting the message polling method employed by mail poller 152 of FIG. 2.

FIG. 5 is a flowchart 500 depicting the message polling method employed by mail poller 152 of FIG. 2. Poller 152 retrieves, parses, and filters mail messages received from disparate sources. Poller 152 acquires the requisite user-specific information to perform these functions from database 230, the contents of which the user can manipulate via mail application 217.

Three events trigger mail polling. The first event is the beginning of what is known as the "polling interval." In one embodiment, external email sources are polled every 15 minutes and native mail sources every two minutes, regardless of whether the user is currently logged onto communications server 105. The user may also initiate polling either by logging on to server 105 or by selecting a "get messages" button on a message-view screen.

Regardless of the way in which polling is initiated, when first triggered, poller 152 takes the user's information from database 230, logs onto the first server listed (step 505), and obtains the first message on the server (step 505).

Each message has a unique identifier (UID). Poller 152 reads the message (step 507) and determines whether the UID is already listed in database 230 (step 509). If not, the message is a new one, and is therefore added to the list of messages in database 230 (step 511). Also in step 511, the message is marked to indicate that the message exists locally and on a remote server. As discussed below, this marking scheme enables poller 152 to synchronize the contents of the local and remote mail servers.

If the user is currently logged onto communications server 105, a circumstance termed "in session," the entire contents of the message, including any attachments, are cached (step 515) in database 230. Caching renders the message content available to the user as soon as the message appears in the user's "in-box." Next, filter 215 determines whether the message meets the requirements of a blocked message (step 517). If so, then the message is unmarked (step 519), causing the message to be deleted at a later step. If, on the other hand, the message is not blocked in step 517, then filter 215 determines whether the message should be dispatched to another device, such as another mail account, a mobile phone, or pager. If so, then dispatcher 154 dispatches the message to the appropriate device (step 521).

In the attached source code, message dispatching, filtering, and blocking are collectively performed by a Filtering And Routing Engine (FARE). In that embodiment, after obtaining messages the poller does a procedure call on a FARE module called "fareworker.java," passing the messages as arguments. The FARE module then employs user-specific filter variables (e.g., from database 230 of FIG. 2) to filter and dispatch the messages.

Returning to flowchart 500, whether the message is dispatched or not, poller 152 then sends the UID and the message header to the local message database in database 230 (step 523) and looks for more messages (step 525). Additional messages are treated in the same manner as the first message. If there are no more messages, then the process moves to step 527, during which unmarked messages are deleted. Unmarked messages include those that were blocked in step 517.

Having read all the messages from the first remote server, poller 152 checks database 230 to determine whether there are more email sources to be polled (step 529). If so, then poller 152 reads the next source (step 531) and returns to step 507.

The first example assumed that the message had not yet been read by poller 152. Periodic polling often results in poller 152 reading messages multiple times. Previously read messages are dealt with in a different way. Steps 505 and 507 are the same for previously read messages. In step 509, however, the UID will already have been listed so the process will move to step 513, during which the message is marked. If the user is in session (step 533), then the entire contents of the message, including any attachments, will be cached to allow the user immediate access to the content (steps 535 and 537). Since the message had been dealt with previously, there is no need to determine whether the message should be blocked or filtered. Consequently, the process moves to step 525.

The foregoing processes for new and old messages will continue until all of the messages on a given server have been processed. Once there are no more messages in the server, the process moves to step 527, in which all of the unmarked messages are deleted. These messages will include those that were blocked in step 517 and those that were not marked in steps 511 and 513. The unmarked messages will be either blocked messages or those that have been deleted at the source, and that should consequently be deleted in the local server. The entire process will then be repeated for each message source listed in database 220.

Once the message sources have been processed, poller 152 goes dormant until the next time polling is initiated. If the user is in session, then the message headers are displayed in step 541. The entire messages may also be displayed when prompted by the user (step 531). If the user is not in session, then nothing happens (step 545) until the user logs on or periodic polling is initiated.

In accordance with another embodiment, the entire message polled from the remote server (for example, remote server 115) is not cached in either step 515 or step 537, but rather is stored within database 230. In addition, messages that are deleted from the remote server are not marked for deletion on the local server in step 511 and 513, and consequently are not deleted in step 527. Communications server 105 saves the UIDs of messages deleted at communications server 105. The next time communications server 105 polls for messages, those messages identified with a deleted UID are not displayed to user. Communications server 105 retains the UIDs of messages deleted from database 230 until those messages are also deleted at the source (e.g., deleted from remote server 115).

Figure 6:
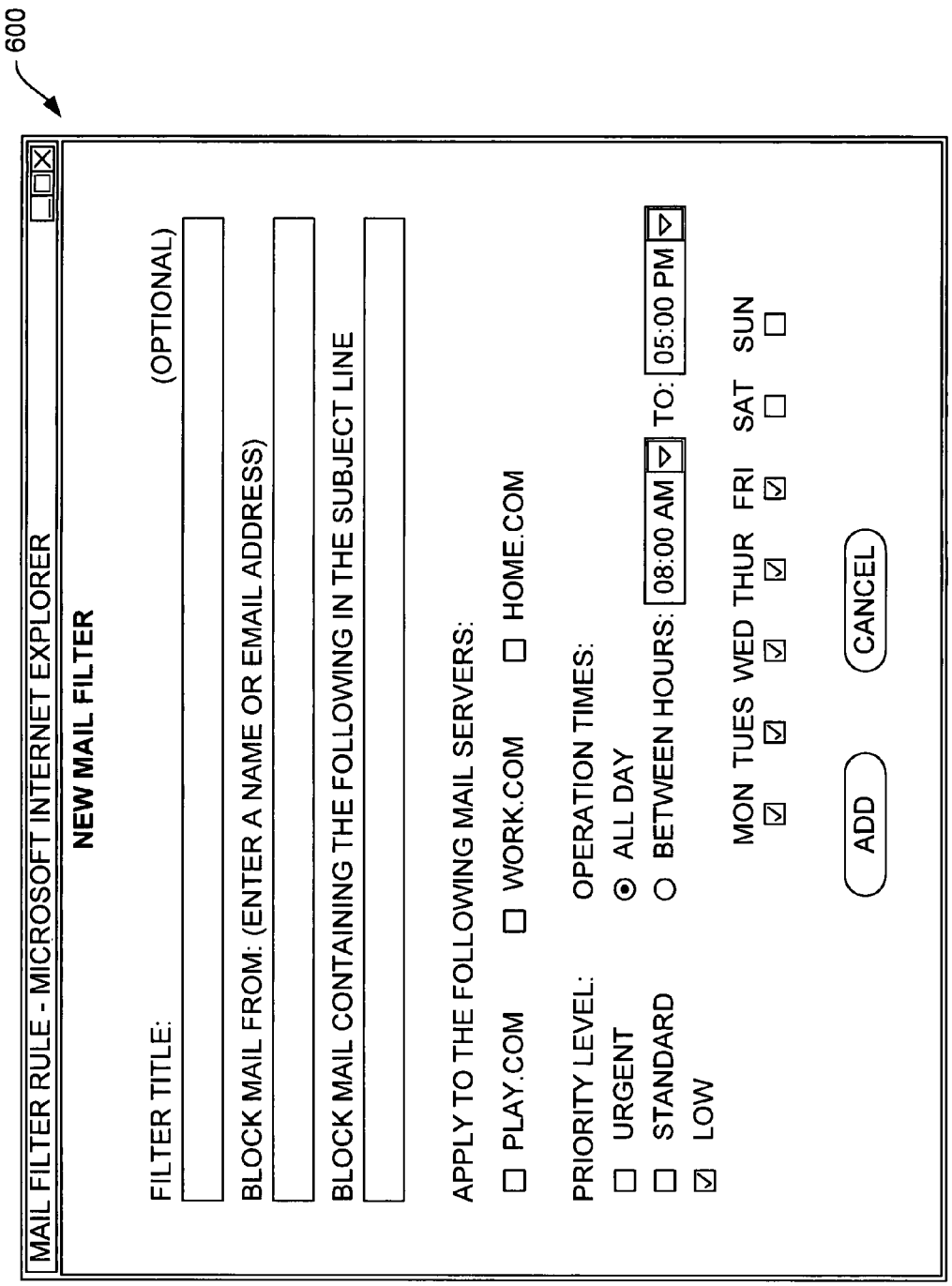
FIG. 6 is a screen shot depicting an HTML form 600 that a user fills in to establish a new mail filter rule.

FIG. 6 is a screen shot depicting an HTML form 600 that a user fills in to establish a new mail filter rule. Form 600 appears when the user clicks on an "Add Blocking Filter" button. As is apparent from the screen shot, the user may block mail messages based on the sender, the subject, the mail source, the priority level, and/or the time at which the message was sent.

The "Filter Title" field in form 600 is purely for user interface, and is not part of the filtering algorithm. Polling engine 210 will generally have already sorted the messages by source (e.g., user@home vs. user@work), so the specified mail servers control polling engine 210, and do not control filter 215. This distinction is transparent to the user.

Mail poller 152 blocks any message that matches any criterion of filter 215. The criteria in any one filter are applied as a group using top-to-bottom inheritance. For example, the definition shown in FIG. 6 would block all low-priority messages sent during any weekday.

When mail poller 152 encounters a match, mail poller 152 blocks the message without further tests. Mail poller 152 then stores the message UID of the blocked message in the user database for future reference. For a message retrieved from a remote mail server, where a copy still exists, the message header and body are flushed permanently from local memory. If a blocked message is retrieved from native mail (in which case no backup copy would otherwise exist), the message is placed into the user's deleted mail folder.

If the message passes all the blocking filters, mail poller 152 stores both its UID and its header in database 220. In addition, if this particular call is taking place while the user is in session, the message body and attachments are cached for the duration of the session.

Filter 215 in mail poller 152 looks for stream patterns in the "from" and "subject" fields. Streams are case-insensitive. The filter string need not be identical to the corresponding portion of the message, but the corresponding portion of the message must include the string. For example, if a message's "from" field reads:

"John Q. Doe"<jdoe1277@aol.com>, then "Doe", "@aol.com", and "e12" yield a match. Conversely, "John Doe" and "America Online" will not yield a match. It is important to note that it is possible to block an entire domain by specifying something like "aol" in the "sender" field.

Filter 215 matches priorities using the "X-priority" field associated with conventional email messages. In database 230, the values for high, medium, and low priority are specified as 1,0, and −1, respectively.

Figure 7:
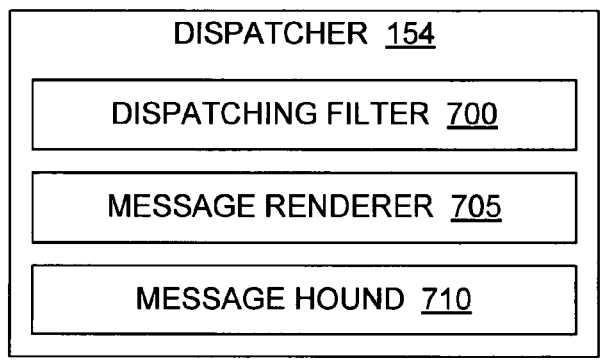
FIG. 7 is a block diagram of dispatcher 154 of FIGS. 1 and 2.

FIG. 7 is a block diagram of dispatcher 154 of FIGS. 1 and 2. Dispatcher 154 includes a dispatching filter 700, a message renderer 705, and a message hound 710.

Figure 8:
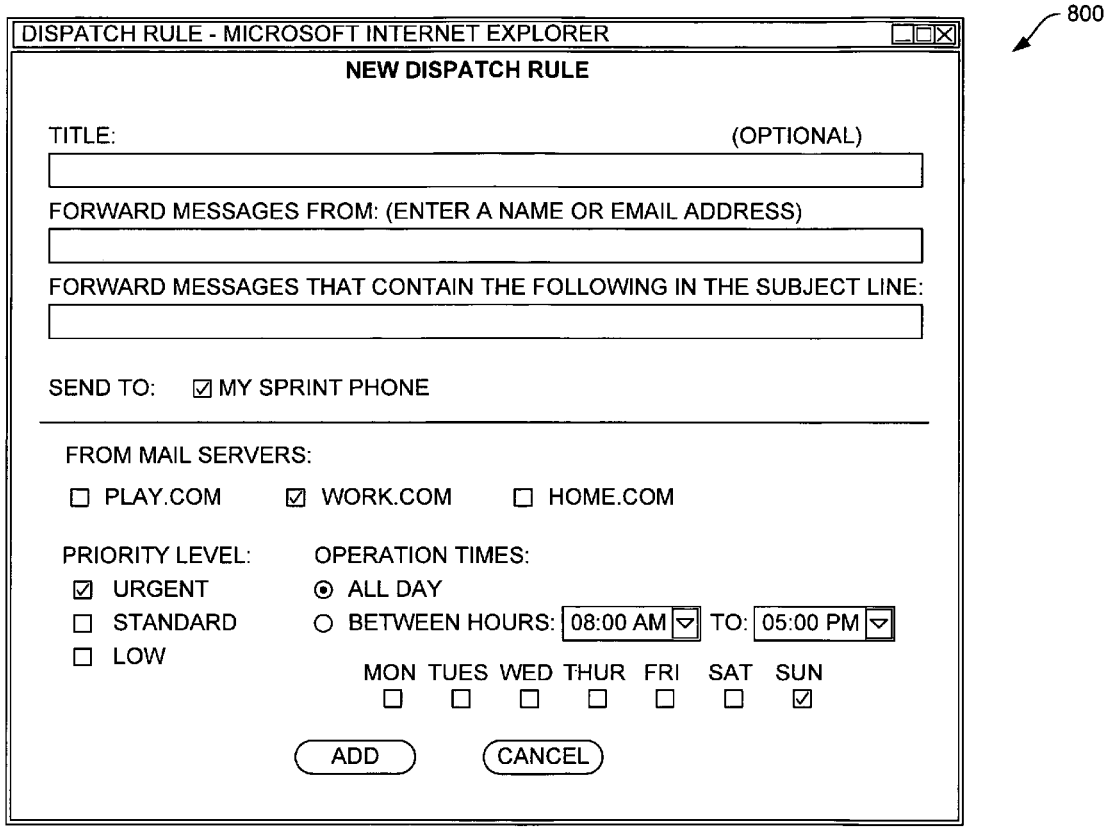
FIG. 8 depicts an HTML form 800 that the user has filled out so that dispatcher 154 forwards all urgent messages from co-workers if those messages are received on a Sunday.

Dispatching filter 700 allows the user to specify one or more forwarding addresses for messages that meet particular filtering requirements. FIG. 8 depicts an HTML form 800 that the user has filled out so that dispatcher 154 forwards all urgent messages from co-workers if those messages are received on a Sunday. Before such dispatching can be accomplished, the user must enter a description of the device to which the messages are to be forwarded. FIG. 9 depicts an HTML form 900 that the user fills out to register a wireless receiving device, such as a pager or mobile phone, so that dispatcher 154 can forward messages to the device.

Form 900 allows the user to include the contents of the subject field, the identities of other users to whom the message was directed, and a limited number of characters from within the message body. This aspect of form 900 is sometimes important for pagers, because some pager companies charge based on the amount of information conveyed to device. In the example of FIG. 9, the wireless device is a mobile phone, and message renderer 705 is instructed to include: 1) the subject, 2) the identities of other users receiving the message, and 3) up to 700 characters within the body of the message.

Message renderer 705 allows users to set different dispatch parameters for different devices. For example, message renderer 705 may be configured to send less information to a pager than to a cellular phone, and to forward the entire contents of the message, including any attachments, if the message is forwarded to a personal computer or laptop. Renderer 705 also reformats messages as necessary to forward some or the entire message content to selected target receiving devices. In a typical example, a user may configure renderer 705 to forward only the subject and sender of important messages to the user's mobile phone.

The final element of dispatcher 154 is message hound 710. Message hound 710 can be configured by the user to establish a hierarchy of devices to which selected messages might be forwarded. For example, the user can configure message hound 710 to forward all urgent messages to a mobile phone and, in the event that the mobile phone is turned off or otherwise out of service, then to send the same or a smaller version of the message to the user's pager. Message hound 710 can also be configured to include another email address, such as that of the user's secretary, in the hierarchy.

Figure 10:
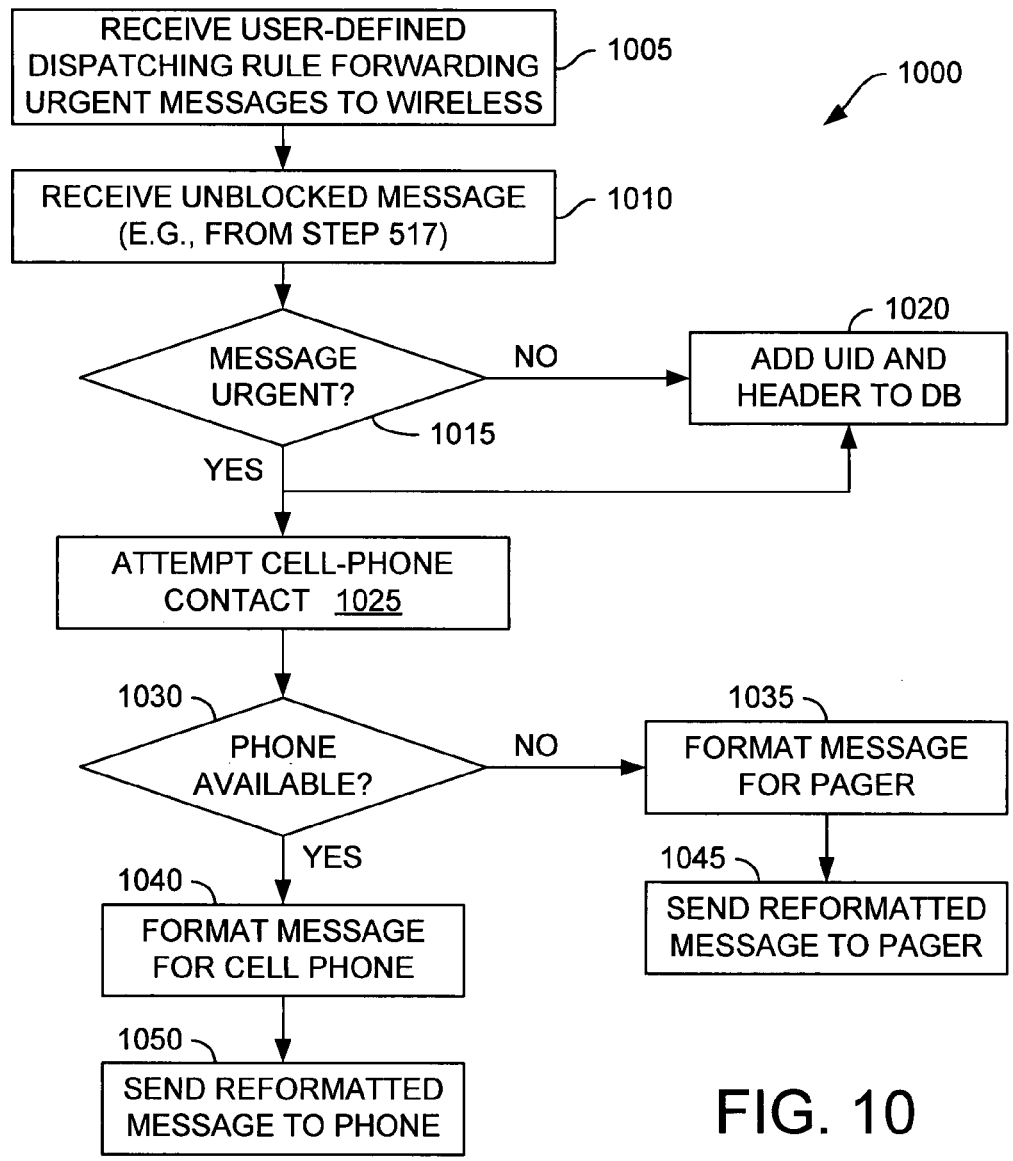
FIG. 10 is a flowchart 1000 depicting an operation of dispatcher 154 in the event the user has specified a dispatch rule as depicted in FIG. 8.

FIG. 10 is a flowchart 1000 depicting an operation of dispatcher 154 in the event the user has specified a dispatch rule as depicted in FIG. 8. In the attached source code, the method for dispatcher 154 is "forwardMessage" in the file "FareWorker" in the source code of the attached CD Appendix.

At step 1005, the user has filled out and submitted form 800, and consequently conveyed the information of form 800 to database 230 (FIG. 2). Dispatcher 154, using the information stored in database 230, subjects subsequently received unblocked messages (step 1010, from step 517 of flowchart 500 of FIG. 5) to the rules defined using form 800 (decision 1015). If the message meets the rules, then a version of the received message should be sent to the user's mobile phone. Regardless of whether the message meets the rules, the message's UID and header are added to the user's database (step 1020). Step 1020 is the same step identified at step 523 in FIG. 5.

If the message is to be forwarded to the user's mobile phone, dispatcher 154 first attempts to contact the specified phone (step 1025). This attempt is made using the Short Messaging Service (SMS) protocol, a conventional protocol adapted for sending short messages to pagers and phones. Using SMS, dispatcher 154 can send a short alphanumeric message to the user's mobile phone.

Per decision 1030, if the user's phone is unavailable (for example, where the phone is turned off or out of the service area), one embodiment of the invention reformats the message for receipt by a pager (step 1035) and then sends the reformatted message to the user's pager (step 1045). This embodiment is beneficial, as pagers generally provide a more robust means of communication than do mobile phones.

Returning to decision 1030, if the mobile phone is available, the message is reformatted as necessary for transmission to the user's cellular phone (step 1040). Finally, the reformatted message is sent to the user's cellular phone (step 1050).

The entire message is preserved in the user's database regardless of whether all or a portion of the message is conveyed to one of the user's wireless devices. The user can therefore access the complete message later from e.g. a personal computer. Additionally, mail application 217 (FIG. 2) responds to instructions from a mobile phone to forward a reformatted message by forwarding the original message stored in database 230. The recipient of the forwarded message is therefore not limited by the capabilities of the forwarding device. For example, a user away from his or her office may forward an urgent message containing an attachment to a nearby computer for viewing or printing. The code that supports this type of forwarding is identified at pages 446-469 of the attached source code as "PhoneComposeMessageHandler."

Message hound 710 can be set to dispatch messages to the next listed device upon receipt of a failure-to-deliver message, or can be set to dispatch the message if the intended recipient does not respond within a given time period. SMTP and WAP can be implemented to let the sender know whether the intended recipient received a message. One embodiment uses this information to report success or failure to the sender. For example, mail application 217 might report that the user's mobile phone was out of service and the user's pager has been alerted.

The foregoing specification and figures are high-level descriptions of some embodiments of the invention. The attached annotated source code details a specific embodiment. The code executes on a Solaris Sparc workstation on a UNIX platform. The messages, user preferences, email sources, and UIDs are stored on a database server, in one embodiment a Microsoft SQL server running on a Windows NT server machine.

While the present invention has been described in connection with specific embodiments, variations of these embodiments will be obvious to those of ordinary skill in the art. For example, polling can be extended from mail sources to other info, such as local weather, sports, or stock quotes. Each embodiment extends to both methods as well as to structures and devices that carry out the methods. Therefore, the spirit and scope of the appended claims should not be limited to the foregoing description.

What is claimed is:

1. A communication server comprising:
   a. a profile server storing user-specific information for a plurality of users, the user-specific information including for each of at least a subset of the users:
      i. message filter variables;
      ii. a first email address; and
      iii. a second email address;
   b. a message filter coupled to the profile server, the message filter to filter email messages directed to the subset of users by application of the message filter variables;
   c. a mail interface to provide a user interface for each of the subset of users, each user interface presenting a reply button and message headings for ones of the email messages directed to the first and second email addresses of one of the users;
   d. wherein the mail interface, responsive to the one user having initiating a first response to a first of the email messages directed to the first email address of the one user, prepares a first reply message identifying the one user as a sender of the first reply message using the first user email address of the one user; and
   responsive to the one of the users having initiating a second response to a second of the email messages directed to the second email address of the one user, prepares a second reply message identifying the one user as a sender of the second reply message using the second email address of the one user.

2. The communication server of claim 1, further comprising a mail poller to poll the email messages from multiple message sources.

3. The communication server of claim 1, further comprising a message dispatcher to dispatch the first email message to a wireless device responsive to message filter variables associated with the one user.

4. The communication server of claim 3, wherein the message filter variables associated with the one user direct the communication server to forward messages directed to the first email address associated with the one user to the wireless device.

5. The communication server of claim 1, further comprising a message dispatcher to reformat the first email message and dispatch the reformatted email message to a wireless device responsive to message filter variables associated with the one user.

6. The communication server of claim 5, wherein the message dispatcher forwards the first message responsive to a command from the wireless device.

* * * * *

UNITED STATES PATENT AND TRADEMARK OFFICE
CERTIFICATE OF CORRECTION

| | | |
|---|---|---|
| PATENT NO. | : 7,546,351 B1 | Page 1 of 1 |
| APPLICATION NO. | : 11/724918 | |
| DATED | : June 9, 2009 | |
| INVENTOR(S) | : Horstmann et al. | |

It is certified that error appears in the above-identified patent and that said Letters Patent is hereby corrected as shown below:

Title page, item (63) add

-- Related U.S. Application Data

(63) Continuation of application No. 11/451,646, filed on June 12, 2006, now abandoned, which is a continuation of application No. 10/921,733, filed on August 17, 2004, now Pat. No. 7,062,538, which is a continuation of application No. 09/641,551, filed on August 17, 2000, now Pat. No. 6,779,022. --.

Column 2, line 24 the word -- of -- should be added after the number "100".

Column 7, line 23 the word "messages" should be changed to -- message --.

Column 8, line 41 the word -- the -- should be added after the word "to".

Signed and Sealed this

Eleventh Day of August, 2009

David J. Kappos
*Director of the United States Patent and Trademark Office*